INVENTORS
Wilfried Fischer
Giancarlo Pini
BY
Pierce, Scheffler & Parker
Attorneys

United States Patent Office

3,484,294
Patented Dec. 16, 1969

3,484,294
FUEL-CELL BATTERY INCLUDING BOTH IMMOBILIZED AND CIRCULATING ELECTROLYTE FUEL CELLS
Wilfried Fischer, Neuenhof, and Giancarlo Pini, Spreitenbach, Switzerland, assignors to Aktiengesellschaft Brown, Boveri & Cie., Baden, Switzerland, a joint-stock company
Filed Aug. 1, 1967, Ser. No. 657,608
Claims priority, application Switzerland, Nov. 29, 1966, 17,057/66
Int. Cl. H01m 27/12
U.S. Cl. 136—86                                                   6 Claims

ABSTRACT OF THE DISCLOSURE

A fuel-cell battery comprises cells of two types located in alternation in a row against one another such that two consecutive cells comprise a common gas feed space. The cells of one type are each comprised of two gas diffusion electrodes embracing a fine-pored carrier layer of asbestos fibers impregnated with an electrolyte, and the cells of the other type are each comprised of two, double layer electrodes embracing a space in which electrolyte in liquid form is circulated.

---

This invention relates to a fuel-cell battery working with gaseous fuel and an aqueous solution as the electrolyte, with devices for removing the reaction water and the reaction heat.

When a relatively high-output fuel cell battery is in operation for a fairly long time, the reaction water produced and the reaction heat produced simultaneously with electro-chemical conversion must be dissipated by special means. In order to solve this problem in alkaline fuel cells, it has been proposed among other things to provide a porous diaphragm impregnated with electrolyte of higher concentration than the cell electrolyte, and communicating on one side with the combustion gas-feed space of the cell and on the other side with a water-dissipation space in which there prevails a lower pressure than in the combustion-gas-feed space. As a reult of this arrangement, the excess water is continuouly evaporated from the electrolyte in the cell, diffused through the combustion-gas-feed space, and condensed where the electrolyte is more highly concentrated, i.e. in the porous diaphragm. Regulation of the pressure in the water-dissipation space causes water corresponding in quantity to the reaction water being formed to be evaporated from the porous diaphragm, and thence to be removed from the system. However, since this excess water can take only a small part of the reaction heat with it, additional special means for heat-dissipation purposes must be provided in the case of this system. For practical operation, it is furthermore necessary to fit the porous diaphragm in the combustion-gas-feed space at a short distance from the anode. This results in considerably more space being required, thus hindering the desirability of making the battery as compact as possible.

The object of the present invention is to make a fuel-cell battery with means for dissipating the reaction water and reaction heat, which battery does not exhibit the said disadvantages, and can be made exceedingly compact.

The fuel-cell battery according to the invention is characterized by cells of a first type and cells of a second type which are placed alternately in a row against one another in such a manner that two consecutive cells comprise a common gas-feed space, the cells of the first type each comprising two gas-diffusion electrodes embracing a fine-pored layer impregnated with electrolyte, and the cells of the second type each consisting of two double-layer electrodes embracing an electrolyte space, and by an electrolyte-circulating system which embraces the cells of the second type, and which comprises means for dissipating heat from the electrolyte and regulating its concentration in solution.

Experience has shown that fuel cells with two gas-diffusion electrodes embracing an electrolyte-space in the form of a fine-pored carrier impregnated with electrolyte exhibit some advantages as compared to ordinary fuel cells in which the electrolyte is present in the form of freely movable liquid, namely, lower internal resistance, smaller size, and lower concentration-polarization caused by the weaker concentration-gradient in the electrolyte. Since in this type of cell the pressure in the gas-feed spaces is the same as that of the electrolyte in the fine-pored carrier, there is also no need to set up a pressure-difference between the gas-spaces and the electrolyte-space.

Cells with freely movable electrolyte have in turn the advantage that reaction heat and reaction water can be dissipated from them in simple manner by means of an electrolyte circulating system.

In the case of the fuel-cell battery according to the invention, the cells of the first type with an electrolyte in a porous diaphragm are advantageously combined with cells of the second type where the electrolyte is freely movable.

The accompanying drawings illustrate an example of embodiment of the fuel-cell battery according to the invention with two cells each of the first and second types.

Figure 1:
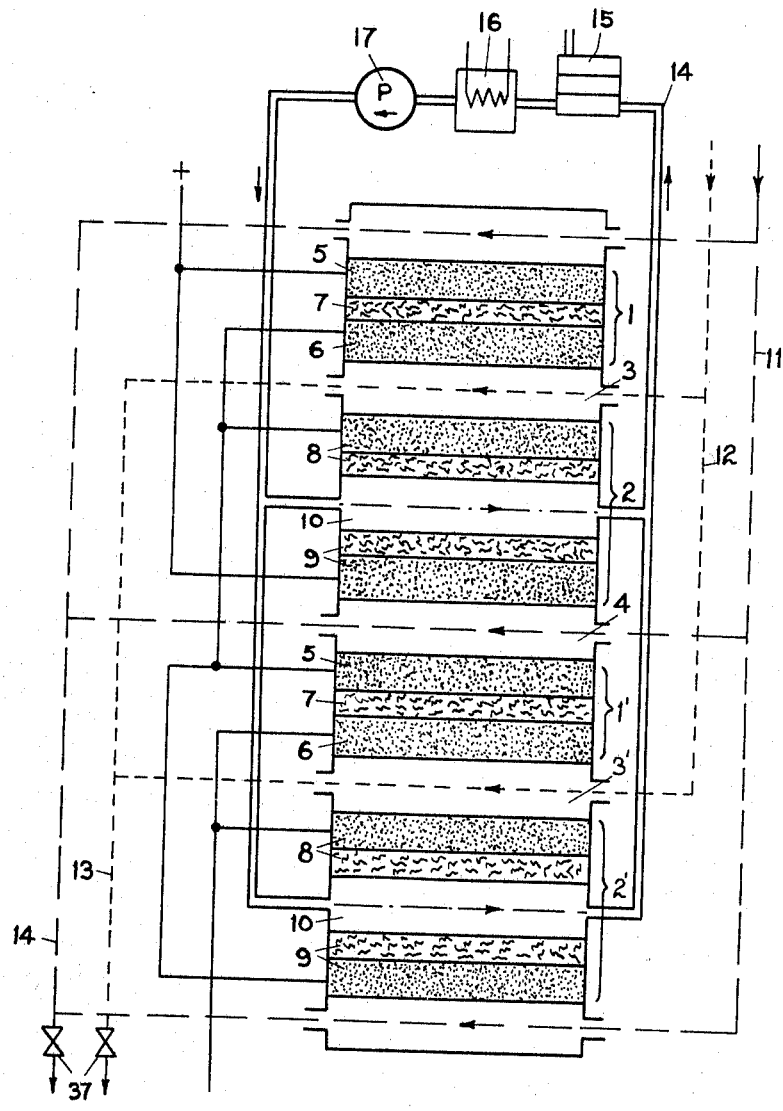
FIG. 1 shows a diagram of the arrangement of the various cells and the circulatory systems for the participating media.

With reference now to the drawings, the cells of the first type 1, 1' are placed against cells of the second type 2, 2' alternately in a row in such a manner that two consecutive cells comprise a common gas-feed space. Thus, the cells 1 and 2 and the cells 1' and 2' comprise in each case a common combustion-gas-feed space 3 and 3' respectively, while the cells 2 and 1' each comprise a common feed space for the gaseous oxidant. The cells of the first type 1, 1' each consist of two gas-diffusion electrodes 5, 6 embracing a fine-pored carrier 7 impregnated with electrolyte (for example KOH). The cells of the second type 2, 2' each comprise two double-layer electrodes 8, 9 embracing a space 10 through which an electrolyte circulates. The electrolyte-impregnated carriers 7 in the cells of the first type 1, 1' and the fine-pored electrolyte-side layers of the double-layer electrodes 8, 9 in the cells of the second type 2, 2' preferably consist of a fine-fibred hydrophilic material, for example, asbestos fibres.

The gaseous oxidant (for example air or $O_2$) and the combustion gas (for example $H_2$) are introduced via collector pipes into the corresponding gas-feed spaces, as indicated by the lines 11 and 12. In order to prevent the inert components or contaminants of the decomposed gases from collecting in the gas-feed spaces, a slight leakage flow of gas is maintained in each case via the collector pipes 13, 14 and via the throttles 37. Electrolyte for the cells of the second type is circulated via the pipe 14 and a device 15 for separating out the reaction water, a heat-exchanger 16 for dissipating the reaction heat and a pump 17 for maintaining the circulation. Two neighboring fuel cells of different types are electrically connected in parallel as a pair, and these pairs of cells are in turn connected in series.

The mechanism of dissipating reaction water and reaction heat now functions in the following manner:

Once current-generation is in progress, reaction water corresponding to the converted electrochemical energy collects in the electrolyte of the cells of the first type, and reduces its concentration. On the contrary, the concentration of electrolyte in the cells of the second type is kept substantially constant by the device 15. The resultant difference in concentration sets up a vapor-pressure-gradient, so that water in the electrolyte of the cells of the first type evaporates, diffuses through the adjacent gas-feed spaces, and condenses again in the electrolyte of the cells of the second type. Since heat is dissipated from the fuel-cell battery via the circulating electrolyte, a temperature-gradient, which still further increases the vapor-pressure gradient and therefore further accelerates the water-dissipation, is set up between the cells. Connecting two cells of each type electrically in parallel enables the battery to continue supplying current even at relatively low temperatures at which water-dissipation from the cells of the first type becomes insufficient, current then emanating from the cells of the second type only. In order to prevent electrolyte from entering the gas-feed spaces, they are maintained at an excess pressure of approximately 0.2 atmosphere with respect to the electrolyte-spaces by a regulator device not shown.

Figure 2:
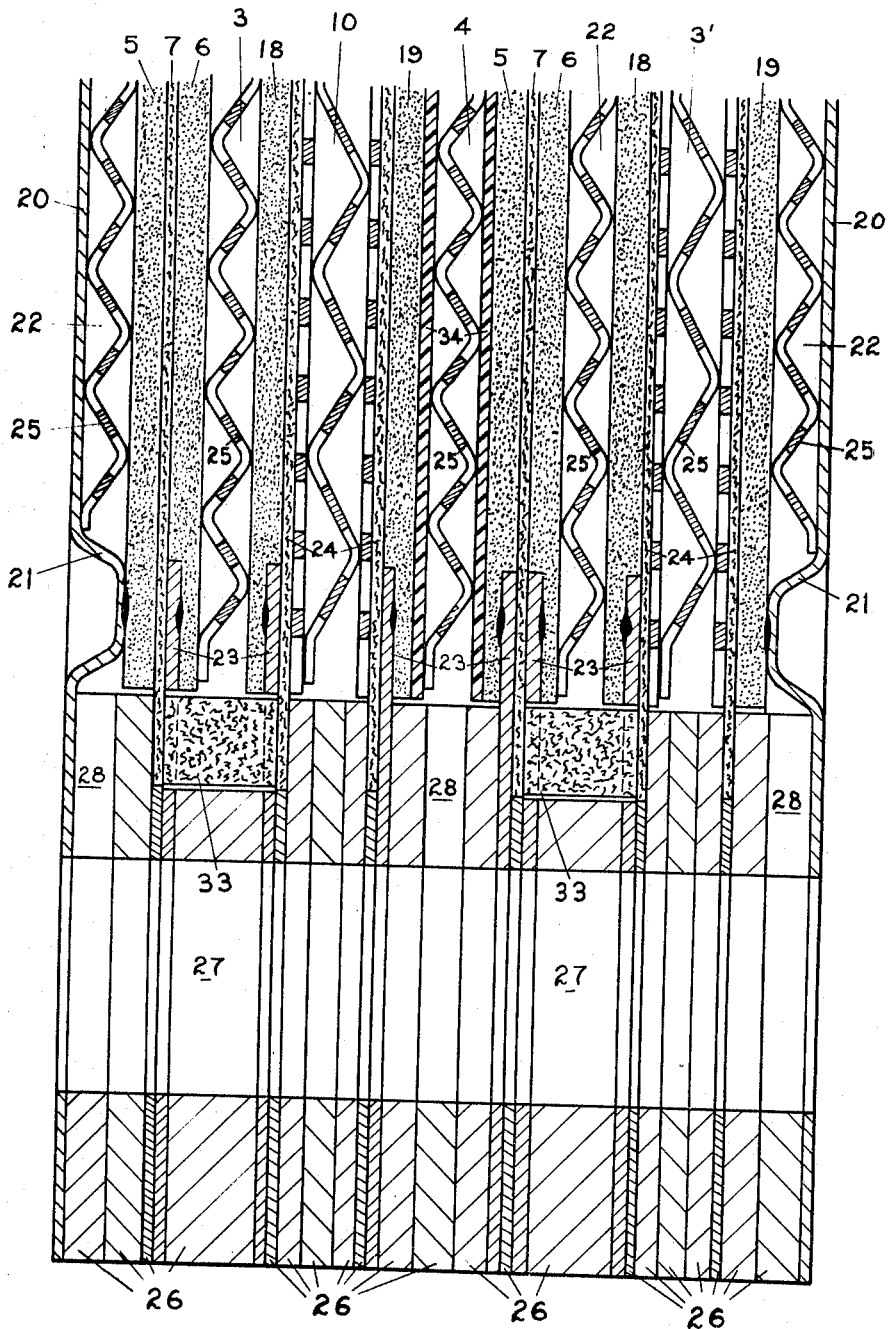
FIG. 2 is a section through an edge zone of the battery shown in FIG. 1.

As shown in FIG. 2, the gas-diffusion electrodes 5, 6 of the cells of the first type and the gas-side layers 18, 19 of the double-layer electrodes in the cells of the second type take the form of plate-shaped porous sintered members whereof the pore-surfaces exhibit a catalytically active structure. The battery is bounded on both sides by sheet-metal covers 20, each comprising depressions 21 via which it is spot-welded to the sintered member of the adjacent outermost electrode, in this way forming the outer gas-feed spaces 22. The sintered members of the remaining electrodes are likewise spot-welded to sheet-metal frames 23. The carrier 7 containing the electrolyte in the cells of the first type and the electrolyte-side layers 24 in the cells of the second type are made up of layers of asbestos. In the gas-feed spaces 3, 3', 4 and 22 and in the electrolyte-spaces 10 in the cells of the second type there are metal racks 25 which support the adjacent electrodes and press the electrode-side layers 24 of the double-layer electrodes 8, 9 against the associated gas-side layers 18, 19. The metal racks 25 in the gas-feed spaces 3, 3' and 22 also take care of the electrical connection of adjacent electrodes. Since the electrodes adjoining the gas-feed space 4 are at different potentials, porous synthetic diaphragms 34 are arranged between the metal rack 25 and the electrodes in order to insulate the latter from one another. The gas-feed spaces and electrolyte-spaces are terminated at their edges by annular sealing elements 26 comprising perforations 27 in order to form continuous ducts serving in each case for common inlet and outlet of the electrolyte, the gaseous fuel and the oxidant. These ducts are linked to the gas-feed spaces and to the electrolyte spaces of the cells of the second type via corresponding cut-aways in the sealing elements. In FIG. 2, the duct illustrated in section is linked via the cut-aways 28 to the gas-feed spaces of the cells.

The cells are connected in parallel or series by corresponding connectors, not illustrated in the figure, on the sheet-metal covers 20 or the sheet-metal frames 23.

The sintered members for the electrodes take the form of plates sintered from nickel powder with 75% porosity. The pore-surface of the plates are impregnated for the hydrogen electrode with 5 mg. of precious metal (75 mol percent Pd+25 mol percent Pt), and for the oxygen electrode with 5 mg. Pt per cm.$^2$ of geometrical electrode surface.

Figure 3:
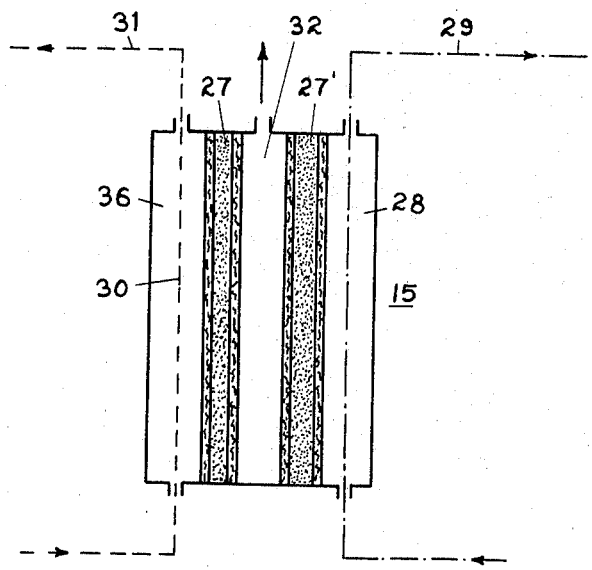
FIG. 3 is a view showing one suitable structure for separating out the reaction water.

A suitable device for separating out the reaction water will be described with reference to FIG. 3. It consists essentially of a housing 36 subdivided by two asbestos diaphragms 27, 27' into three chambers. The hot electrolyte from which it is required to remove the reaction water flows through the first outer chamber 28 as shown by the line 29. Cold water flows through the second outer chamber 30 as shown by the line 31. The middle chamber 32 is linked to one of the gas-feed spaces of the battery, and is therefore likewise at an excess pressure of approximately 0.2 atmosphere with respect to the flow of electrolyte. Because of the vapor-pressure-difference between the hot electrolyte and the cold water, water evaporates from the diaphragm 27' and condenses in the diaphragm 27, and is finally dissipated in the water-circulating system 31.

In order that the fuel-cell battery may be fitted up dry, the electrolyte-impregnated carrier in each cell of the first type may be linked to the fine-pored layer of a double-layer electrode in an adjoining cell of the second type by bridges of fine-fibred material. In an advantageous form of embodiment, these bridges consist of asbestos segments 33 (FIGURE 2) inserted into corresponding cut-aways in the sealing elements 26 or in the sheet-metal frames 23. Because of these bridges, the carriers 7 in the cells of the first type likewise become impregnated after a while with electrolyte once the electrolyte-circulating system has been filled.

We claim:

1. In a fuel-cell battery operating with a gaseous fuel and a gaseous oxidant and an electrolyte in the form of an aqueous solution, the combination comprising a plurality of cells of a first type and a plurality of cells of a second type, said cells being located alternately in a row against one another such that two consecutive cells comprise a common gas-feed space, said cells of said first type each comprising two gas-diffusion electrodes embracing a fine-pored carrier impregnated with aqueous electrolyte, said cells of said second type each comprising two double-layer electrodes embracing a space through which aqueous electrolyte in liquid form is passed, and a system for circulating the liquid electrolyte, said circulating system including means for regulating the concentration of the liquid electrolyte and means for removing the reaction heat therefrom.

2. A fuel-cell battery as defined in claim 1 wherein said fine-pored electrolyte carriers of said cells of said first type and the electrolyte side layers of said double layer cells of said second type are constituted by fine-fibred hydrophilic material.

3. A fuel-cell battery as defined in claim 1 wherein said electrolyte impregnated fine-pored carrier of each of said cells of said first type is linked to the electrolyte side layer of a double layer cell of said second type by at least one bridge of fine-fibred hydrophilic material, the electrolyte side layer of said double layer cell and said fine-pored carrier also being constituted by a fine-fibred hydrophilic material.

4. A fuel-cell battery as defined in claim 1 wherein said gas-diffusion electrodes of said cells of said first type and the gas side layers of said double layer cells of said second type are constituted by porous sintered material.

5. A fuel-cell battery as defined in claim 1 wherein said fine-pored electrolyte carriers of said cells of said first type and the electrolyte side layers of said double layer cells of said second type are constituted by fine-fibred hydrophilic material, and wherein said gas-diffusion electrodes of said cells of said first type and the gas side layers of said double layer cells of said second type are constituted by porous sintered material.

6. A fuel-cell battery as defined in claim 1 and wherein adjacent cells are electrically connected in parallel in pairs, of cells are connected in series.

References Cited

UNITED STATES PATENTS

| 2,070,612 | 2/1937 | Niederreither | 136—86 |
| 3,080,442 | 3/1963 | Hobert | 136—86 |
| 3,126,302 | 3/1964 | Drushella | 136—86 |
| 3,188,242 | 6/1965 | Kordesch et al. | 136—86 |
| 3,411,951 | 11/1968 | Gelting | 136—86 |

ALLEN B. CURTIS, Primary Examiner

PO-1050
(5/69)

UNITED STATES PATENT OFFICE
CERTIFICATE OF CORRECTION

Patent No. 3,484,294　　　　　　　Dated December 16, 1969

Inventor(s) Wilfried Fischer and Giancarlo Pini

It is certified that error appears in the above-identified patent and that said Letters Patent are hereby corrected as shown below:

Claim 6, last line, "and said pairs" has been omitted after "pairs," - the last line should read "pairs, and said pairs of cells are connected in series".

SIGNED AND
SEALED
JUN 2 1970

(SEAL)
Attest:

Edward M. Fletcher, Jr.
Attesting Officer

WILLIAM E. SCHUYLER, JR.
Commissioner of Patents